United States Patent
Lowes et al.

(10) Patent No.: US 6,950,759 B2
(45) Date of Patent: Sep. 27, 2005

(54) APPARATUS AND METHOD FOR DETERMINING THE AMOUNT OF FLOW OF A SUBSTANCE THROUGH A TUBE/PIPE

(76) Inventors: John M. Lowes, 6716 Evanston Ave., Las Vegas, NV (US) 89108; Leonard P. Darley, 5717 Solimar La., Las Vegas, NV (US) 89130; Scott A. Andrele, 292 Palm Trace Ave., Las Vegas, NV (US) 89148; York Andrus, 1430 S. Tenaya Way, Las Vegas, NV (US) 89117; David Edward McCauley, 443 Sherburne Rd., Portsmouth, NH (US) 03801-4726; Daniel K. Carlisle, 3 Ashley Dr., Amesbury, MA (US) 01913

( * ) Notice: Subject to any disclaimer, the term of this patent is extended or adjusted under 35 U.S.C. 154(b) by 168 days.

(21) Appl. No.: 10/361,525

(22) Filed: Feb. 7, 2003

(65) Prior Publication Data
US 2004/0158415 A1 Aug. 12, 2004

(51) Int. Cl.⁷ .................................................. G01F 1/00
(52) U.S. Cl. ................................. 702/45; 705/1; 705/28
(58) Field of Search .............................. 702/45; 705/28, 705/1; 222/129.1

(56) References Cited

U.S. PATENT DOCUMENTS 6,718,311 B1 * 4/2004 Suo-Anttila .................. 705/28

* cited by examiner

Primary Examiner—Bryan Bui
Assistant Examiner—Stephen J. Cherry
(74) Attorney, Agent, or Firm—Jeffrey D. Moy; Harry M. Weiss; Weiss, Moy & Harris, P.C.

(57) ABSTRACT

A sensor system for monitoring fluid flow through a tube/pipe has one or more sensors coupled to the tube/piping. An I/O board is coupled to the sensor for receiving measurement signals from the sensor. A computer system is coupled to the I/O board and having an application program to interpret and record the measurement signals.

18 Claims, 12 Drawing Sheets

| Keg | Brand | 12 c | 16 c | 32 c | Part Poure | oz Poure | Total Poure | Keg Remaining | Idl PS | Keg status |
|---|---|---|---|---|---|---|---|---|---|---|
| 1 | Budweiser | 1 | 1 | 1 | 1 | 11.747 | 118 | 882 | 18.8 | idle |
| 2 | | | | | | | | | | OFF |
| 3 | | | | | | | | | | OFF |
| 4 | | | | | | | | | | OFF |
| 5 | | | | | | | | | | OFF |
| 6 | | | | | | | | | | OFF |
| 7 | | | | | | | | | | OFF |
| 8 | | | | | | | | | | OFF |
| 9 | | | | | | | | | | OFF |
| 10 | | | | | | | | | | OFF |
| 11 | | | | | | | | | | OFF |
| 12 | | | | | | | | | | OFF |
| 13 | | | | | | | | | | OFF |
| 14 | | | | | | | | | | OFF |
| 15 | | | | | | | | | | OFF |
| 16 | | | | | | | | | | OFF |

Reports

| Shift | Quarter |
| Day | Year |
| Week | Custom |
| Month | Real time |

System

| Keg Change | System Setup |
| Convert Data | Logs |

Status

Sunday, June 28, 1998 22:17:51

Fig. 10D

APPARATUS AND METHOD FOR DETERMINING THE AMOUNT OF FLOW OF A SUBSTANCE THROUGH A TUBE/PIPE

BACKGROUND OF THE INVENTION

1. Field of the Invention

This invention relates generally to monitoring devices and, more specifically, to an apparatus and process for determining the quantity of a fluid which is delivered through a tube/pipe over a certain amount of time.

2. Description of the Prior Art

Beverage dispensers often operate by combining beverage fluids to form a desired drink, such as lemonade, orange juice, cola, and the like. Typically, a beverage concentrate is combined with a mixing fluid, such as carbonated water, to form a desired drink. The beverage dispenser draws each of the beverage fluids from a respective external source. As such, the desired drink is dispensed from the beverage dispenser through a dispensing valve. Beverage fluid lines are provided by the beverage dispenser to ultimately deliver each beverage fluid from the external source to the dispensing valves. Pressurized air generally is used to transport the beverage concentrate and the mixing fluid through the fluid lines.

Beer dispensers or taps work in a similar manner. The difference being that the beer is directly dispensed from the beer container/keg through the fluid lines and out the dispenser.

In the restaurant and bar industry, it is important to monitor the amount of beverages that have been dispensed. This will allow the owner of the restaurant/bar to see if the bartender is over or under serving (i.e., dispensing too much per glass or not enough, too much foam). The owner would further be able to see if the bartender is dispensing drinks and not charging for them.

Presently, there are no ways to actually monitor the flow of a beverage through the fluid lines. There are sensors which indicate if a particular container is out of fluid, but no way to actually monitor the flow of a beverage through the fluid lines.

Therefore, a need existed to provide a device for determining the flow of media/fluid through a tube/pipe. The device must be able to measure the flow rate of the media/fluid regardless of the size, shape, diameter, length, etc. of the tube/pipe. The device must be able to measure the flow rate of the media/fluid regardless of the pressure variances in the tube/pipe. The device must be able to take electronic signals and translate/interpret the signals into usable measurement data.

SUMMARY OF THE INVENTION

In accordance with one embodiment of the present invention, it is an object of the present invention to provide a device for determining the flow of media/fluid through a tube/pipe.

It is another object of the present invention to provide a device that is able to measure the flow rate of the media/fluid regardless of the size, shape, diameter, length, etc. of the tube/pipe.

It is still another object of the present invention to provide a device that is able to measure the flow rate of the media/fluid regardless of the pressure variances in the tube/pipe.

It is another object of the present invention to provide a device that is able to take electronic signals and translate/interpret the signals into usable measurement data.

BRIEF DESCRIPTION OF THE EMBODIMENTS

In accordance with one embodiment of the present invention, a sensor system for monitoring fluid flow through a tube/pipe is disclosed. The sensor system has a sensor coupled to the tube/piping. An I/O board is coupled to the sensor for receiving measurement signals from the sensor. A computer system is coupled to the I/O board and having an application program to interpret and record the measurement signals.

In accordance with another embodiment of the present invention, a sensor system for monitoring fluid flow through a tube/pipe having an application program which interprets, monitors and records measurement signals. The application program accomplishes the above by: monitoring signals which represent flow activity through the tube/pipe; comparing flow amount to a predetermined amount; updating statistics if the flow amount is approximately equal to the predetermined amount; and storing the flow amount to a partial flow amount if the flow amount is not the predetermined amount.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 4:
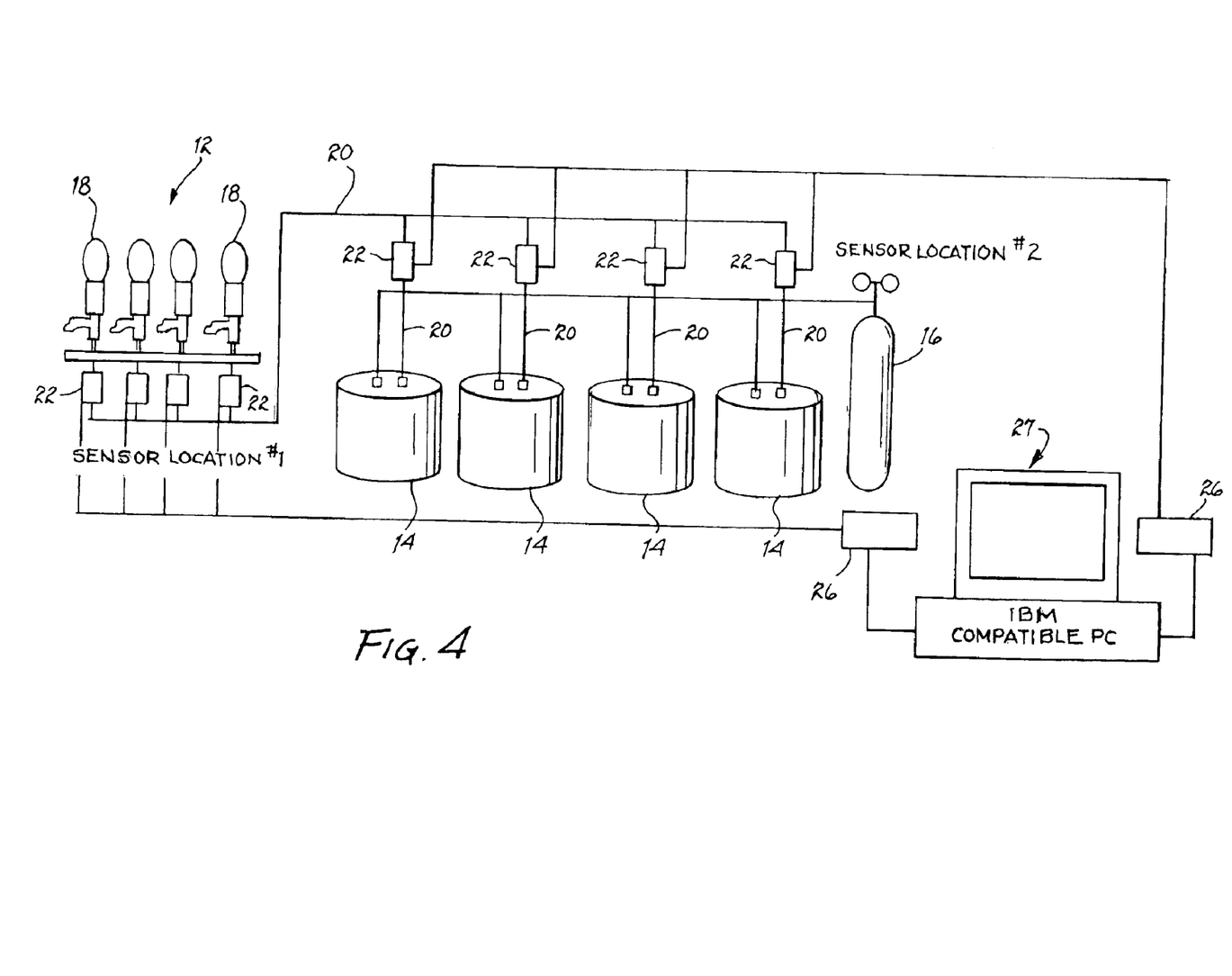
FIG. 4 is a simplified functional block diagram of one embodiment of the present invention.
Figure 5A:
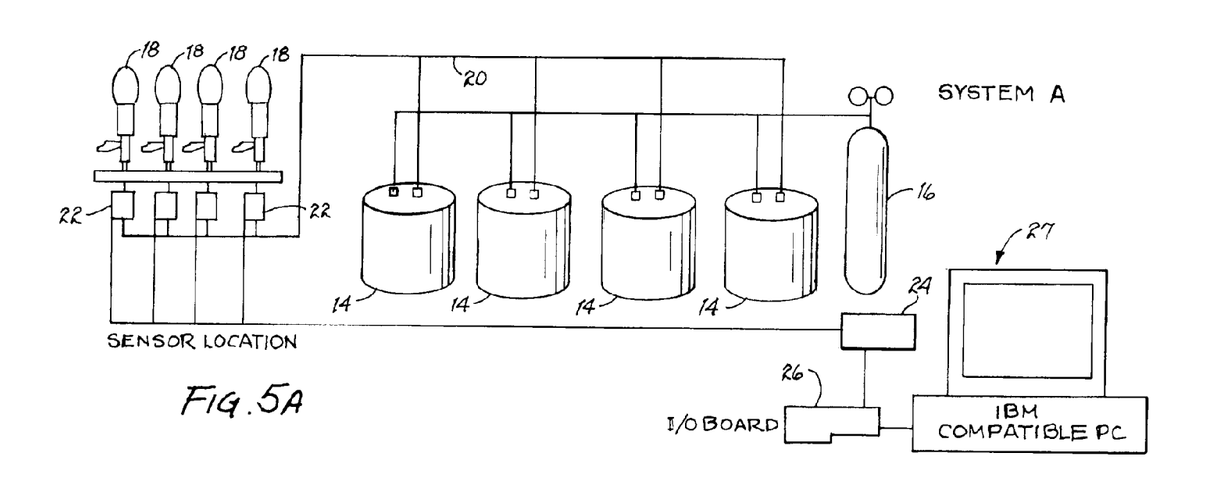
FIG. 5A is a simplified functional block diagram of another embodiment of the present invention.
Figure 5B:
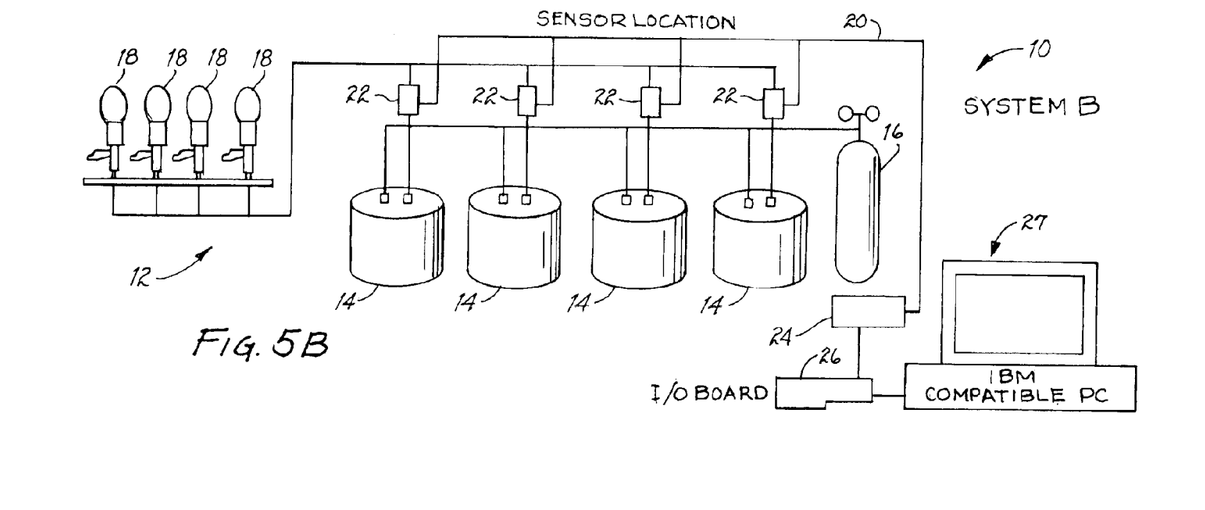
FIG. 5B is a simplified functional block diagram of another embodiment of the present invention.

Referring to FIGS. 4–5B, a simplified functional block diagram of the sensor system used for monitoring fluid flow through a tube/pipe 10 (hereinafter sensor system 10) is shown. The sensor system 10 may be coupled to any system where the monitoring of a fluid through a tube/pipe (hereinafter tube) is required. However, the description of the sensor system 10 will be made in reference to a beverage dispensing system 12.

The sensor system 10 is able to be connected to any new or existing beverage dispensing system 12. In a general beverage dispensing system 12, there are a plurality of beverage containers 14. The beverage containers 14 will store either the actual beverage to be dispensed or a beverage concentrate with a mixing fluid in another beverage container 14. Each of the beverage containers 14 are coupled to a pressurizing container 16. The pressurizing container 16 are generally compressed air canisters which inject pressurized air into the beverage containers 14 in order to dispense the liquid out of the beverage containers 14. A plurality of dispensing taps 18 are also coupled to the beverage containers 14. The dispensing taps 18 are used to dispense the fluid from the beverage containers 14 and into a glass, cup, etc. for service. The dispensing taps 18 are generally coupled to the beverage container 14 via fluid dispensing tubes/piping 20. When the dispensing tap 18 is opened, the pressurizing container 16 will force the fluid stored within the beverage container 14 out of the beverage container and through a fluid dispensing tube 20 and out of the dispensing tap 18.

The sensor system 10 will use one or more sensors 22. The sensors 22 are used to monitor fluid flow through the fluid dispensing tubes 20. Referring to FIGS. 4–5, the sensors 22 may be located at different locations within the beverage dispensing system 12. FIG. 4 shows that the sensors 22 are located at two positions. The sensors 22 are located at each end of the fluid dispensing tube 20. A first set of sensors 22 are located right before each fluid dispensing tube 20 is coupled to the dispensing tap 18. A second set of sensors 22 are located at the other end of each fluid dispensing tube 20 right after the fluid dispensing tube 20 has been coupled to a beverage container 14. Each of the sensors 22 are then coupled via sensor connectors 24 to an I/O board 26. The I/O board 26 is coupled to a computer system 27 which will monitor and interpret electronic signals from each of the sensors 22. It should be noted that the position of the sensors 22 shown in FIG. 4 are given as an example and should not be seen as to limit the scope of the present invention. The sensors 22 may be placed in different locations. For example, FIG. 5A shows the sensors 22 located right before each fluid dispensing tube 20 is coupled to the dispensing tap 18. FIG. 5B shows the sensors 22 located at the other end of each fluid dispensing tube 20 right after the fluid dispensing tube 20 has been coupled to a beverage container 14. Again, this is only shown as an example. The sensors 22 may be located in any position between that shown in the Figures without departing from the spirit and scope of the present invention.

Figure 2:
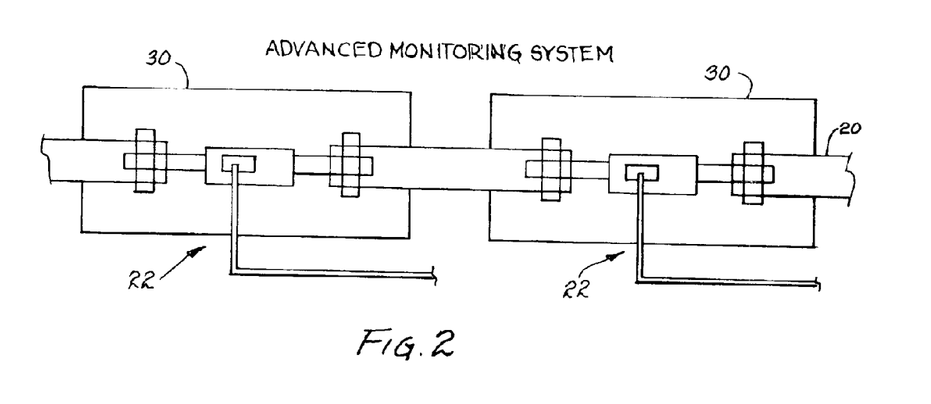
FIG. 2 is a close-up view of one embodiment of the sensors used in the present invention to monitor fluid flow through a fluid line.
Figure 3:
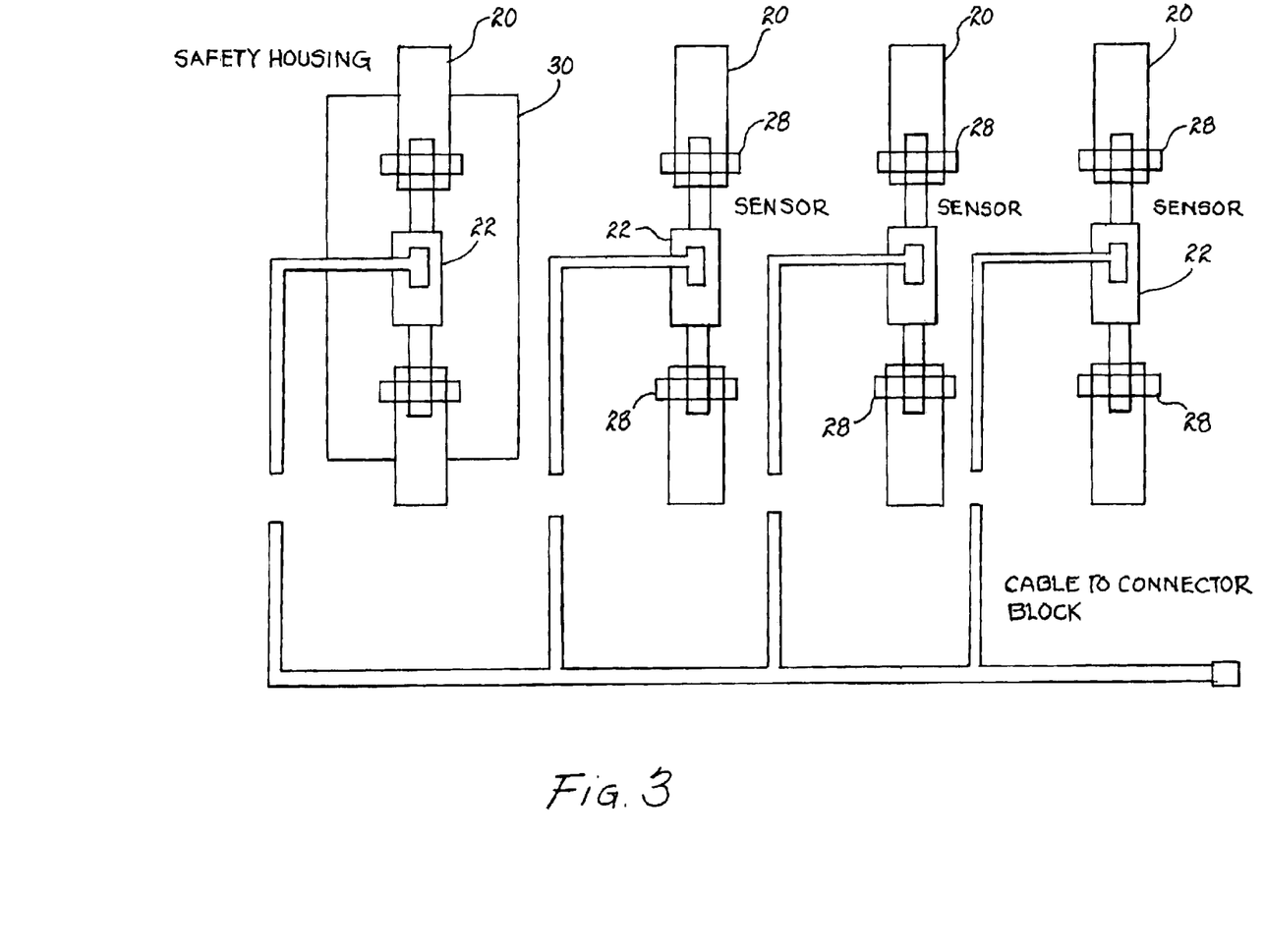
FIG. 3 is an expanded view of the sensors depicted in FIG. 2.

The sensors 22 may be coupled to the fluid dispensing tubes 20 in one of two different manners. Referring to FIGS. 2–3, the sensors 22 are located internal to each of the fluid dispensing tubes 20. In this embodiment, the fluid dispensing tube 20 is cut through. Alternatively, the sensor 22 could be used to coupled two separate pieces of the fluid dispensing tube 20 together. The sensor 22 is inserted within the fluid dispensing tube 20. Tightening devices 28 are positioned around the edges of the fluid dispensing tube 20 and tightly secured. When tightly secured, the tightening device 28 will form a leak proof seal between the sensor 22 and the fluid dispensing tube 20. If desired, a safety housing 30 may further be placed around the sensor 22. The safety housing 30 will enclose the sensor 22 and dispensing tube 20 assembly in order to ensure no leakage.

Alternatively, the sensors 22 may be placed on the exterior surface of the fluid dispensing tube 20. If the sensors are placed on the exterior surface of the fluid dispensing tube 20, one must ensure that the sensors 20 are securely attached to the exterior surface in order to achieve the most accurate measurement of fluid flow through the fluid dispensing tube 20. The sensors 22 may be coupled to the fluid dispensing tube 20 in a variety of different manners. Connectors may be used to secure the sensors 22 to the exterior surface of the fluid dispensing tube 20. Alternatively, an adhesive may be used. The above are just given as an example and should not be seen as to limit the scope of the present invention.

Figure 8A:
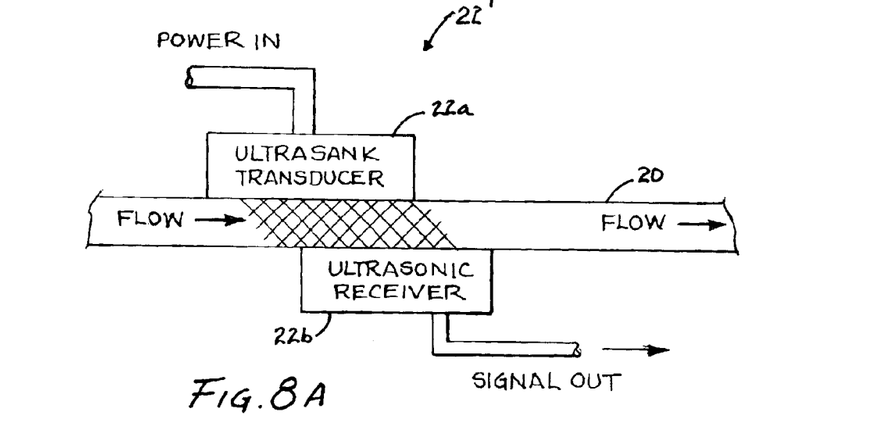
FIG. 8A is one embodiment of the sensors used in the present invention.
Figure 8B:
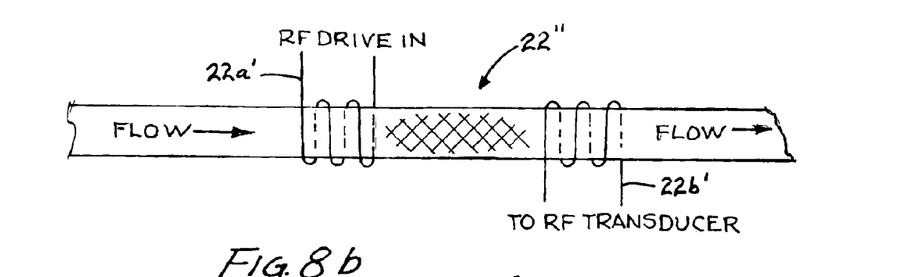
FIG. 8B is another embodiment of the sensors used in the present invention.
Figure 8C:
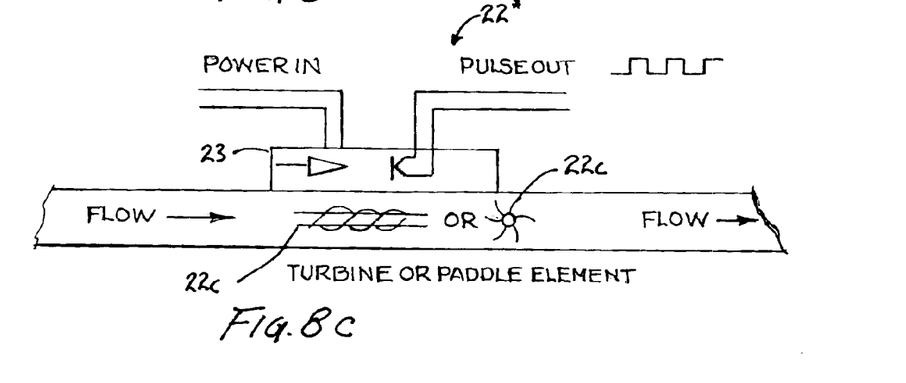
FIG. 8C is another embodiment of the sensors used in the present invention.

Referring to FIGS. 8A–8C, different types of sensors 22 are shown. In the embodiment depicted in FIG. 8A, the sensor 22 is an ultrasonic sensor 22'. The ultrasonic sensor 22' is coupled to an exterior surface of the fluid dispensing tube 20. The ultrasonic sensor 22' has a transducer $22a$ coupled to one side of the fluid dispensing tube 20 and a receiver $22b$ coupled on a second side of the fluid dispensing tube 20. The transducer $22a$ will send signals which are received by the receiver $22b$. The fluid flow through the fluid dispensing tube 20 will affect the signals received by the receiver $22b$. The signals received by the receiver $22b$ will be sent to the computer system 27. The computer system 27 will then interpret the signals to determine the quantity of the fluid which is delivered through a fluid dispensing tube 20.

Referring to FIG. 8B, another type of sensor 22 is shown. In FIG. 8B, an RF sensor 22" is shown. The RF sensor 22" is comprised of an RF driver $22a''$ and an RF transducer $22b''$. The RF sensor 22" works in a similar manner as the previous embodiment. The RF driver $22a''$ will send RF signals which are received by the RF transducer $22b''$. The fluid flow through the fluid dispensing tube 20 will affect the RF signals received by the RF transducer $22b''$. The signals received by the RF transducer $22b''$ will be sent to the computer system 27. The computer system 27 will then interpret the signals to determine the quantity of the fluid which is delivered through the fluid dispensing tube 20.

Referring to FIG. 8C, another type of sensor 22 is shown. The sensor 22 in FIG. 8C is an internal sensor 22*. The internal sensor 22* has a turbine/paddle element 22C. A monitoring device 23 is used to monitor the rotation of the turbine/paddle element 22C. The rotation of the turbine/paddle element 22C will generate a signal which is sent to the computer system 27. The computer system 27 will then interpret the signals to determine the quantity of the fluid which is delivered through the fluid dispensing tube 20.

Figure 1:
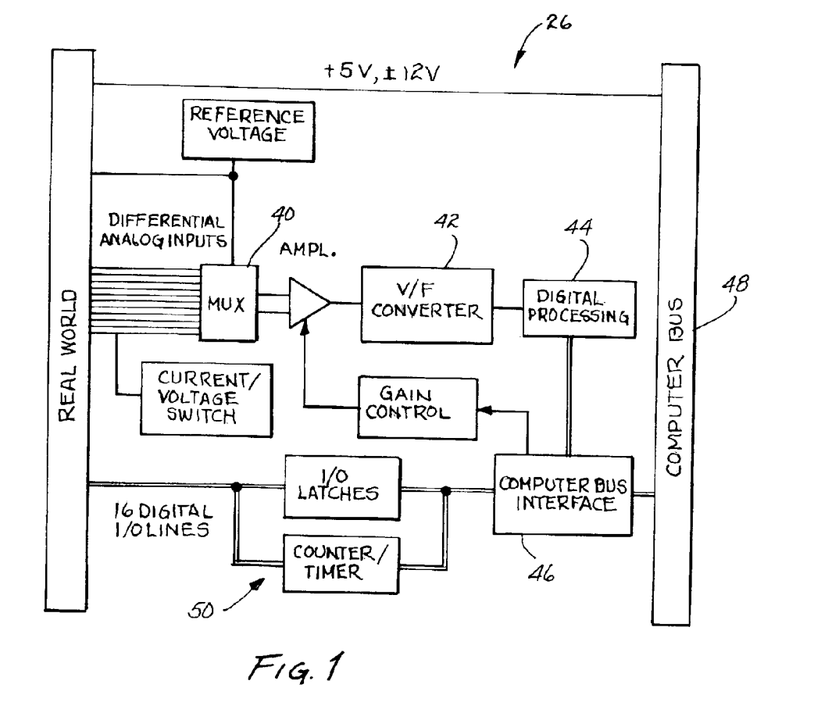
FIG. 1 is a simplified functional block diagram of a portion of the hardware used to monitor and interpret signals in the apparatus of the present invention.
Figure 6:
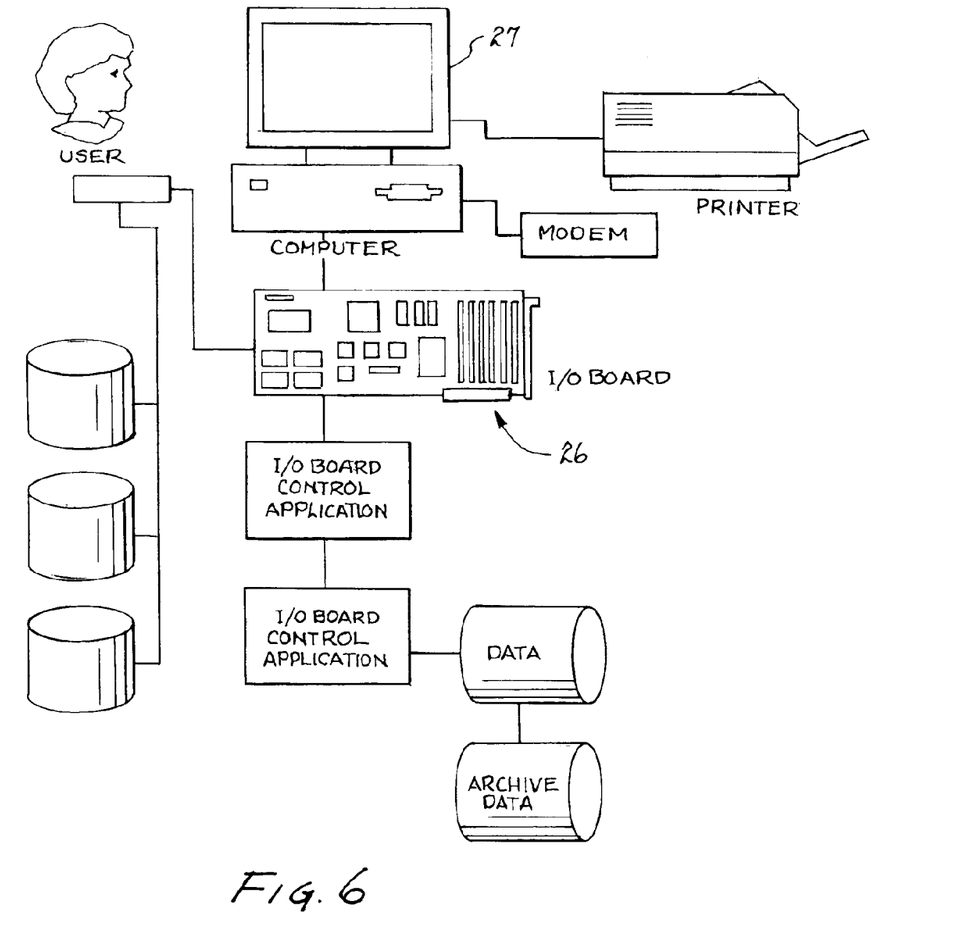
FIG. 6 is a simplified functional block diagram of some of the electronics used in the present invention to collect and interpret signals.
Figure 7:
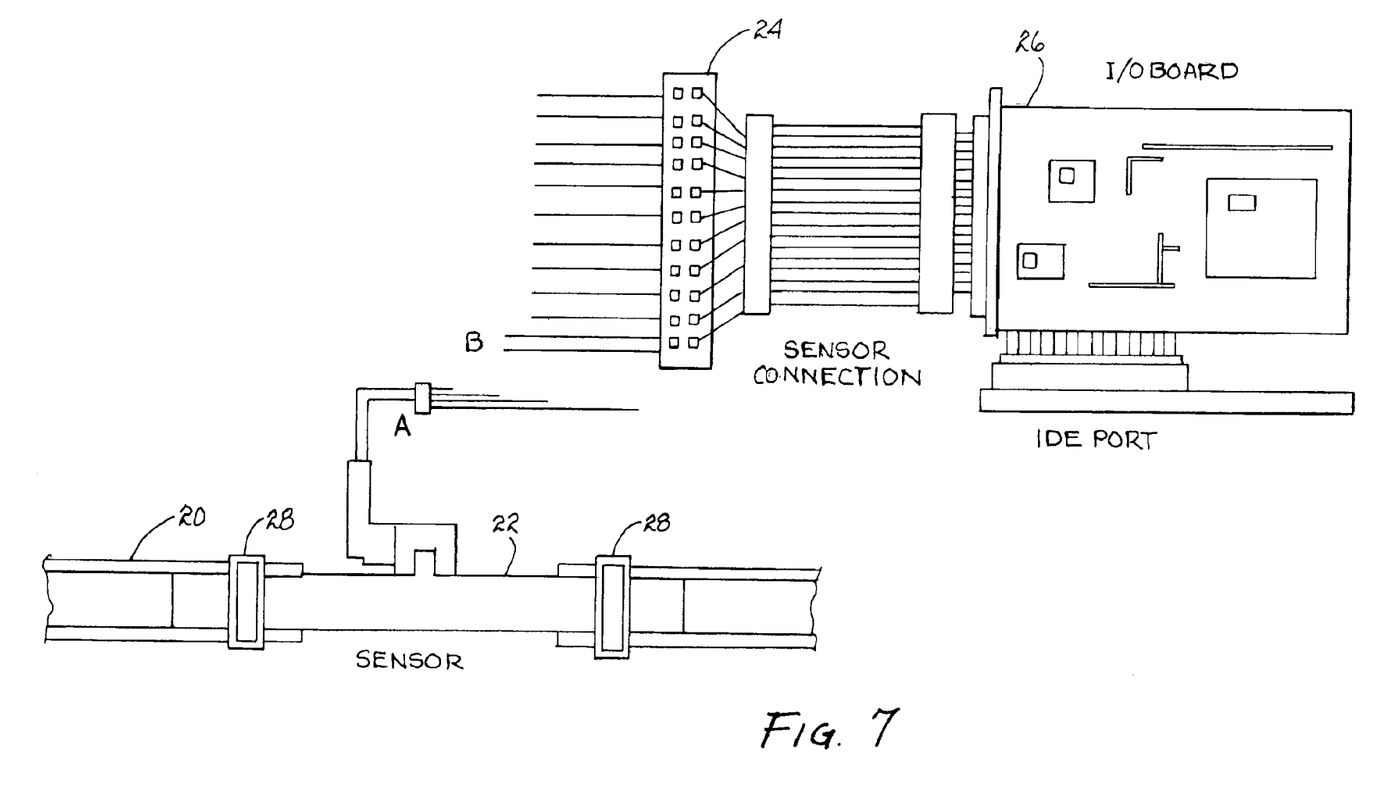
FIG. 7 is a simplified functional block diagram of the connection between the sensors and the I/O board.

Referring now to FIGS. 1 and 6, all of the monitored signals are sent to an I/O board 26. The I/O board 26 is used to collect all of the signals from the sensors 22. These signals are then converted to a digital signal and sent to the computer system 27 for analysis. The I/O board 26 has a multiplexer 40 which will receive the signals. The output of the multiplexer 40 is sent through a voltage-frequency converter 42 and then through a digital processing unit 44. The output of the digital processing unit 44 is coupled to a computer bus interface 46. The computer bus interface 46 has outputs to a computer bus 48 of the computer system 27 and inputs to a latch/counter-timer mechanism 50. The latch/counter-timer mechanism 50 will ensure that all of the signals from the inputs have been monitored before sending the signals to the computer system 27 for analysis.

The computer system 27 is programmed to analyze the signals received from the sensors 22. The program will use these signals to determine the amount of liquid that has flowed through the fluid dispensing tube 20.

Figure 9A:
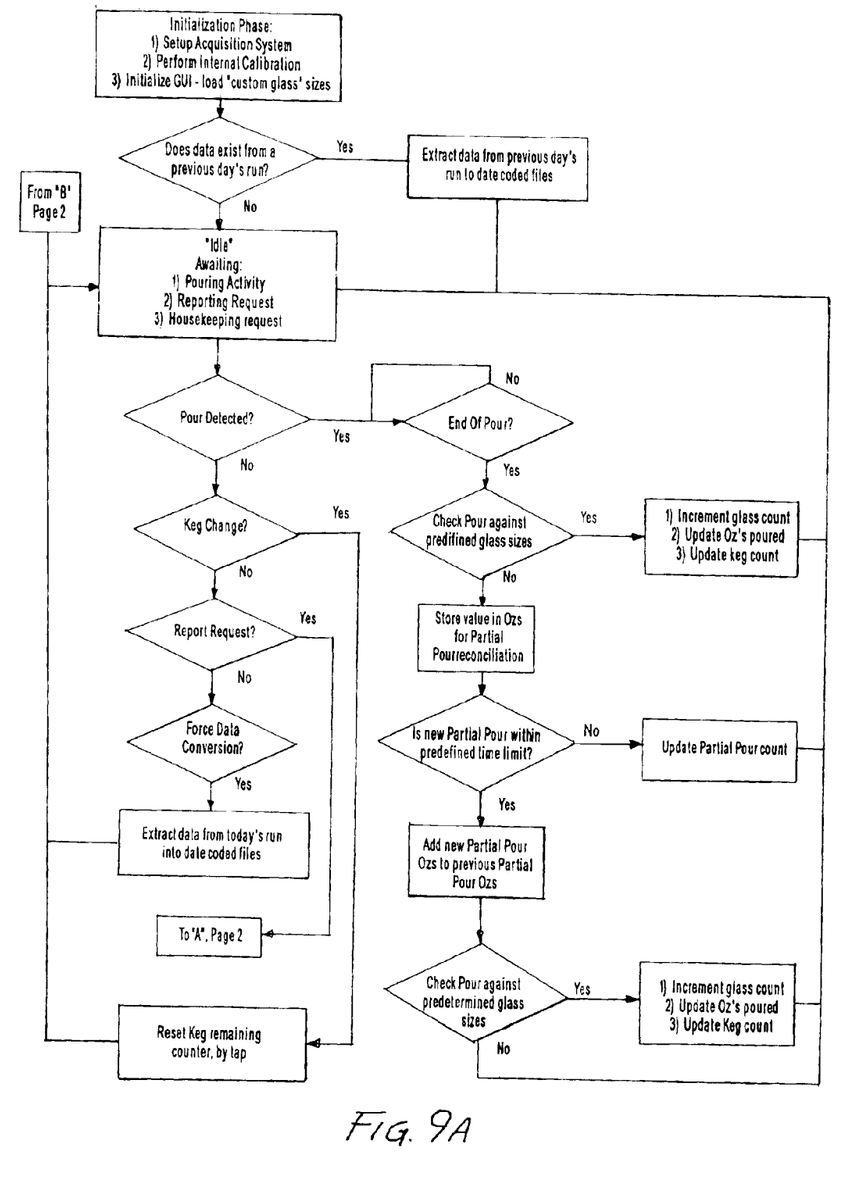
FIG. 9A is a flowchart depicting a computer program used by the computer system in the present invention.
Figure 9B:
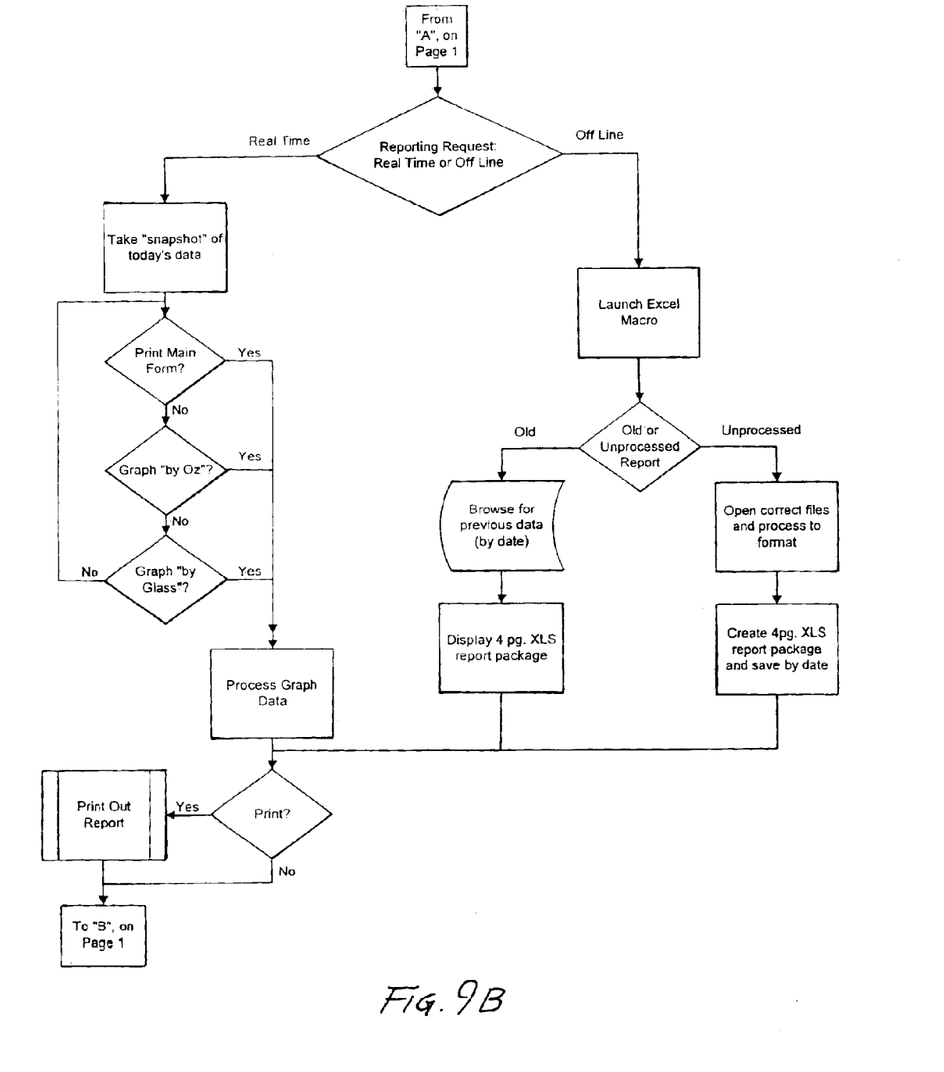
FIG. 9B is a flowchart depicting a computer program used by the computer system in the present invention.

Referring now to FIGS. 9A–9B, the program in the computer system 27 will allow one to initialize and set-up the system 10. The initialization phase of the program allows for automatic set-up of the system 10, performs internal calibration, and sets up glass serving sizes. Once this is done, the program determines if there was any existing data from the previous day. If there was some existing data, the program will retrieve this data and extracts it to a data coded file before moving on to the next portion of the program.

The program will remain in an idle state multiplexed across all available channels until one of the following occurs: 1) pouring activity, 2) report request, or 3) housekeeping request. If a pour is detected on any channel, the program will wait until the pour is complete. It will then determine if the pour was of a preset glass size. If it was a preset glass size, the program increments the glass count, updates the ounces poured, and updates the keg count (i.e., how much is left in the keg). The program will then go back to an idle state as defined above. If the pour is not of a predefined value, the program calculates the amount dispensed and stores this value in a partial pour reconciliation file. It will then determine if the partial pour was done within a predefined time limit. If the partial pour was not done during a predefined time limit, the partial pour count is updated and the program goes back to the idle state.

If the partial pour is done within a predetermined time frame, the current partial pour amount is added to previous partial pour amounts. This total amount of the fluid dispensed is checked against the predefined glass sizes. If the amount matches a predetermined glass size, the program will 1) increment the glass count, 2) update the amount poured, and 3) update the keg count. If the amount does not match a predefined glass size, the partial pour count is updated. After either of the two above steps are completed, the program will go back to the idle state.

In the idle state, if no pour is detected, the program will determine if there is a request for a keg/canister change. If a keg/canister change has been requested, the program will reset the keg/canister remaining count and then return to the idle state. If a keg/canister change has not been requested, then the program will ask to see if a report has been requested.

Figure 10A:
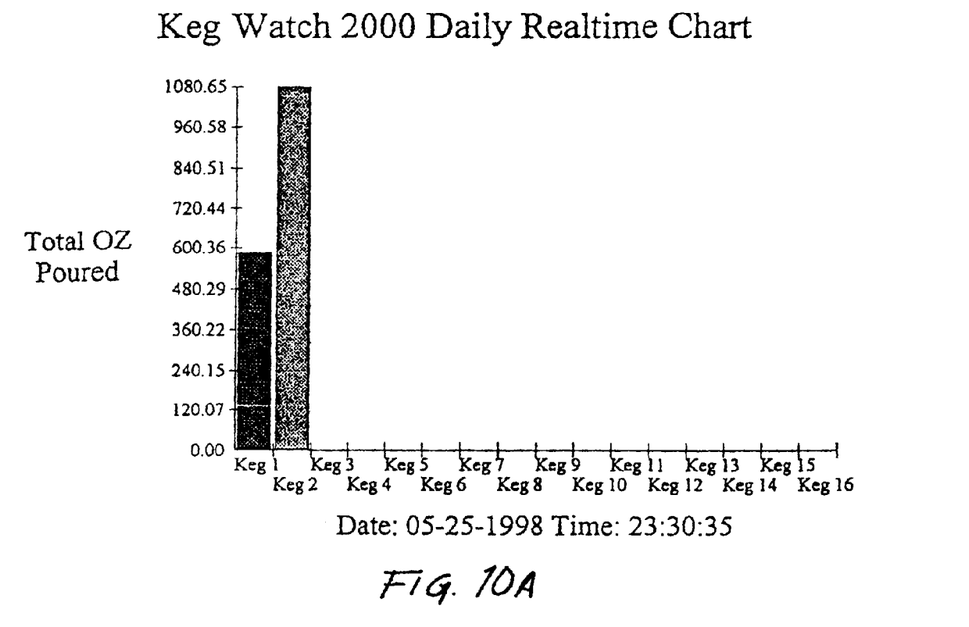
FIG. 10A shows a data display from the computer program used in the present invention.
Figure 10B:
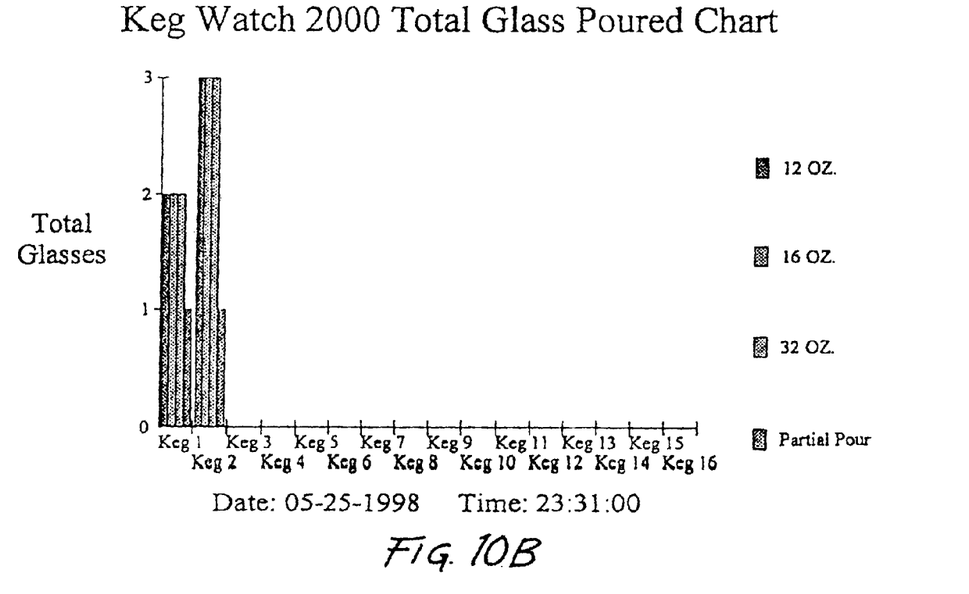
FIG. 10B shows a data display from the computer program used in the present invention.
Figure 10C:
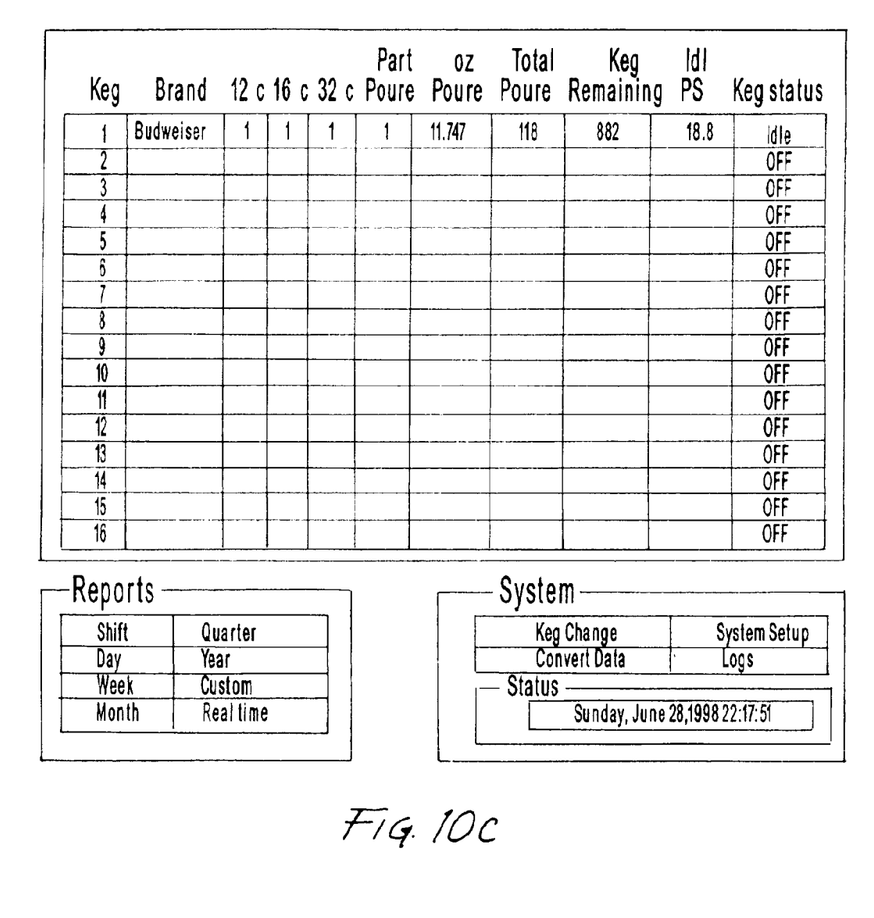
FIG. 10C shows a data display from the computer program used in the present invention.
Figure 10D:
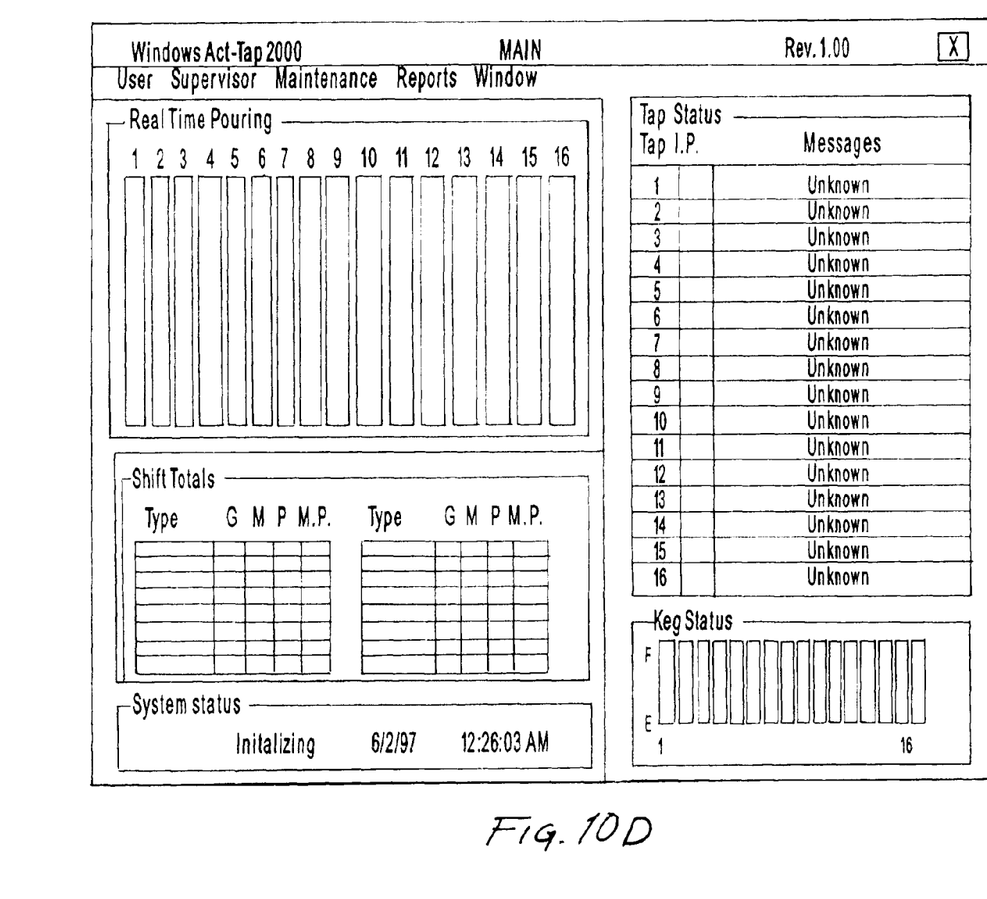
FIG. 10D shows a data display from the computer program used in the present invention.

If a report has been requested, the program will ask if a real time or off line report is desired. If real time data is requested, then the program will review the current data. The person requesting the data can then either print the data in a main data format (FIG. 10C), a graph of amount poured (FIG. 10A), amount of glasses poured (FIG. 10B), etc. The information is then viewed on a monitor and/or printed. The program will then return back to the idle state.

If an off line report is requested, the program will determine if an old report or an unprocessed report is requested. If an old report is requested, the data is looked up and retrieved. The data is then displayed. One may further have the option of printing the data. The program will then return to the idle state. If an unprocessed report is requested, the program will open and process the requested data. The data will be then be saved in a desired format. The data can be displayed and/or printed if desired. The program will then return to the idle state.

If a report is not requested, the program will determine if a data conversion is requested. If no data conversion is requested, the program will return to the idle state. If a data conversion is requested, the program will extract the current data from the day's operation for the person to review. The program will then return to the idle state.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sensor system for monitoring fluid flow through a tube/pipe comprising:
    a sensor coupled to the tube/piping;
    an I/O board coupled to the sensor for receiving measurement signals from the sensor; and
    a computer system coupled to the I/O board and having an application program to interpret, monitor and record the measurement signals wherein the application program interpret, monitor and record the measurement signals by:
        monitoring signals which represent flow activity through the tube/pipe;
        comparing flow amount to a predetermined amount;
        updating statistics if the flow amount is approximately equal to the predetermine amount;
        store the flow amount to a partial flow amount if the flow amount is not the predetermine amount;
        determining if a change of a beverage container coupled to the sensor system has been requested;
        reset container counter if the beverage container coupled to the sensor system has been requested to be changed; and
        determine if a report request has been made.

2. A sensor system for monitoring fluid flow through a tube/pipe in accordance with claim 1 wherein the application program interpret, monitor and record the measurement signals by further:
    determining if the partial flow amount was during a predefined time limit;
    update a partial pour count if the partial flow amount was not during a predefined time limit;
    add the partial flow amount to a directly previous partial flow amount if the partial flow amount was during a predefined time limit;
    compare the sum of the partial flow amount and the directly previous partial flow amount to the predetermined amount if the partial flow amount was not during a predefined time limit; and
    updating statistics if the sum of the partial flow amount and the directly previous partial flow amount is approximately equal to the predetermined amount.

3. A sensor system for monitoring fluid flow through a tube/pipe in accordance with claim 1 wherein the application program interpret, monitor and record the measurement signals by further:

determining if data conversion is requested; and extracting current data into a data coded file.

4. A sensor system for monitoring fluid flow through a tube/pipe in accordance with claim 1 wherein the application program interpret, monitor and record the measurement signals by further:

determining if a real time report has been requested;

retrieve current data; and displaying current data.

5. A sensor system for monitoring fluid flow through a tube/pipe in accordance with claim 4 wherein the application program interpret, monitor and record the measurement signals by further printing current data.

6. A sensor system for monitoring fluid flow through a tube/pipe in accordance with claim 4 wherein the application program interpret, monitor and record the measurement signals by further printing the desired old off line report.

7. A sensor system for monitoring fluid flow through a tube/pipe in accordance with claim 1 wherein the application program interpret, monitor and record the measurement signals by further:

determining if an off line report has been requested;

determining if an old off line report is requested; and display desired old off line report if an old off line report is requested.

8. A sensor system for monitoring fluid flow through a tube/pipe in accordance with claim 1 wherein the application program interpret, monitor and record the measurement signals by further:

determining if an off line report has been requested;

determining if an unprocessed off line report is requested;

open the unprocessed off line report; and display desired old off line report if an old off line report is requested.

9. A sensor system for monitoring fluid flow through a tube/pipe in accordance with claim 8 wherein the application program interpret, monitor and record the measurement signals by further printing the desired unprocessed off line report.

10. A sensor system for monitoring fluid flow through a tube/pipe having an application program which interprets, monitors and records measurement signals by:

monitoring signals which represent flow activity through the tube/pipe;

comparing flow amount to a predetermined amount;

updating statistics if the flow amount is approximately equal to the predetermine amount;

store the flow amount to a partial flow amount if the flow amount is not the predetermine amounts;

determining if a chance of a beverage container coupled to the sensor system has been requested;

reset container counter if the beverage container coupled to the sensor system has been requested to be changed; and determine if a report request has been made.

11. A sensor system for monitoring fluid flow through a tube/pipe in accordance with claim 10 wherein the application program interpret, monitor and record the measurement signals by further:

determining if the partial flow amount was during a predefined time limit;

update a partial pour count if the partial flow amount was not during a predefined time limit;

add the partial flow amount to a directly previous partial flow amount if the partial flow amount was during a predefined time limit;

compare the sum of the partial flow amount and the directly previous partial flow amount to the predetermined amount if the partial flow amount was not during a predefined time limit; and updating statistics if the sum of the partial flow amount and the directly previous partial flow amount is approximately equal to the predetermined amount.

12. A sensor system for monitoring fluid flow through a tube/pipe in accordance with claim 10 wherein the application program interpret, monitor and record the measurement signals by further:

determining if data conversion is requested; and extracting current data into a data coded file.

13. A sensor system for monitoring fluid flow through a tube/pipe in accordance with claim 10 wherein the application program interpret, monitor and record the measurement signals by further:

determining if a real time report has been requested;

retrieve current data; and displaying current data.

14. A sensor system for monitoring fluid flow through a tube/pipe in accordance with claim 13 wherein the application program interpret, monitor and record the measurement signals by further printing current data.

15. A sensor system for monitoring fluid flow through a tube/pipe in accordance with claim 13 wherein the application program interpret, monitor and record the measurement signals by further printing the desired old off line report.

16. A sensor system for monitoring fluid flow through a tube/pipe in accordance with claim 10 wherein the application program interpret, monitor and record the measurement signals by further:

determining if an off line report has been requested;

determining if an old off line report is requested; and display desired old off line report if an old off line report is requested.

17. A sensor system for monitoring fluid flow through a tube/pipe in accordance with claim 10 wherein the application program interpret, monitor and record the measurement signals by further:

determining if an off line report has been requested;

determining if an unprocessed off line report is requested;

open the unprocessed off line report; and display desired old off line report if an old off line report is requested.

18. A sensor system for monitoring fluid flow through a tube/pipe in accordance with claim 17 wherein the application program interpret, monitor and record the measurement signals by further printing the desired unprocessed off line report.

* * * * *